UNITED STATES PATENT OFFICE.

HUGH A. GALT, OF AKRON, OHIO, ASSIGNOR TO COLUMBIA CHEMICAL COMPANY, OF BARBERTON, OHIO, A CORPORATION OF PENNSYLVANIA.

PROCESS OF MAKING MAGNESIUM CHLORID.

1,262,939.  Specification of Letters Patent.  Patented Apr. 16, 1918.

No Drawing.  Application filed January 22, 1915. Serial No. 3,822.

*To all whom it may concern:*

Be it known that I, HUGH A. GALT, a resident of Akron, in the county of Summit and State of Ohio, have invented a new and useful Improvement in Processes of Making Magnesium Chlorid, of which the following is a specification.

This invention relates to a method of manufacturing chlorids of the alkaline earth metals, and particularly magnesium chlorid. The object of the invention is to provide an improved method whereby chlorids of this class can be manufactured by a simple reaction and at low cost, and particularly a method which can be carried out profitably in connection with the ammonia soda process for the manufacture of crude bicarbonate of soda and the manufacture of caustic soda by the well known process.

Briefly stated, the method consists in subjecting a magnesium containing substance, such as the carbonate, sulfate, hydrate, or the like, to suitable treatment with a chlorid of an alkaline earth metal, to produce a double decomposition, and thereby convert the magnesium in the magnesium containing substance to magnesium chlorid and also producing a salt of the alkaline earth metal whose chlorid is utilized in the treatment. This is a simple reaction and the materials used therein enable it to be carried out profitably for the production of chlorids of this class, especially when it can be carried out in conjunction with the caustic soda and ammonia soda processes before referred to.

In producing caustic soda on a commercial scale a common method treats soda ash or sodium carbonate with lime (CaO), the mass action of the large quantity of water present converting the sodium carbonate into sodium hydrate and precipitating calcium carbonate. This reaction can also be carried out with lime formed from material containing magnesium, such as dolomite rock or magnesite, which are respectively a compound carbonate of calcium and magnesium and a carbonate of magnesium alone. The final products of this process are caustic soda and a solid precipitated carbonate, which contains calcium or magnesium, or both, depending upon the composition of the rock from which the lime is made.

According to the present process, which aims to produce chlorid of magnesium, the lime is manufactured from magnesite, which produces a substantially pure precipitated magnesium carbonate, called "magnesia alba", having the symbol $MgCO_3.Mg(OH)_2$, according to the method described more fully in my co-pending application of even date herewith, Serial No. 3,822, for a process for manufacturing magnesium salts.

The precipitated magnesium carbonate, or the magnesia alba, produced in connection with the caustic soda process described in said application, is treated with the proper amount of a solution of a chlorid of one of the alkaline earth metals, such as calcium, barium or strontium chlorid. The proportions of magnesium carbonate or magnesia alba and chlorid of the alkaline earth metal will, of course, depend upon the relative molecular weights of the two substances entering into the reaction, and are calculated in advance. Said substances are mixed together in a large vat or tank, which may be either heated externally in any suitable manner, or into which steam may be introduced. The reaction takes place more readily when the solution is warm and usually the reaction is carried out at about boiling temperature. It is also promoted if carried out under pressure, and for this reason the vat or tank is preferably sealed so as to enable the pressure therein to be raised above atmospheric, either by introducing steam under pressure therein, or by heating it externally to boiling temperature to generate steam within the tank and thereby increase the pressure.

When this reaction is carried out for a suitable length of time, preferably while agitating the material in said vat, the chlorin of the alkaline earth metal chlorid unites with the magnesium of the magnesium carbonate or magnesia alba, and simultaneously the reaction produces a carbonate, or a carbonate and hydrate, of the alkaline earth metal of which the chlorid is used.

When the reaction is complete the supernatent solution, containing the magnesium chlorid is drawn off, or is separated from the precipitate in any other suitable manner, as by filtering or decantation. The solution may be evaporated to the desired concentration to form fused magnesium chlorid, but preferably is evaporated to the crystallizing point, and the salt separates in small finely divided crystals which are readily soluble.

The precipitate, containing the carbonate and hydrate of the alkaline earth metal, may be washed and dried and used in any suitable manner, such as for whiting, filler or the like.

The method may be carried out very cheaply in connection with some other method which produces a chlorid of an alkaline earth metal as a byproduct. One such method is that in common use for the production of crude bicarbonate of soda, and known as the ammonia soda process. In said process a common salt solution is treated with carbonic acid and ammonia gases to form crude bicarbonate of soda, ammonium chlorid and some ammonium carbonate. After separation of the crude bicarbonate the solution is treated in heated stills into which is introduced milk of lime for distilling such ammonia gas as does not separate freely. These stills produce large quantities of what is usually considered a waste product and which contains calcium carbonate, calcium hydrate and calcium and sodium chlorid solution. This waste product may be conducted to settling tanks in which the solid substances are separated, and the solution containing the calcium and sodium chlorid after the sodium chlorid is removed by evaporation, may be evaporated further or used directly in the production of magnesium chlorid in the manner before described. In case calcium chlorid is used and the substance initially treated is magnesia alba, containing both calcium carbonate and calcium hydrate, the reactions are as follows:—

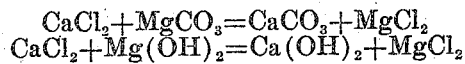

$$CaCl_2 + MgCO_3 = CaCO_3 + MgCl_2$$
$$CaCl_2 + Mg(OH)_2 = Ca(OH)_2 + MgCl_2$$

The carbonate of the alkaline metal (calcium in this instance) produced by the first reaction, is wholly insoluble and therefore precipitates as usual. The calcium hydrate produced by the second reaction is usually sparingly soluble in water solutions, but in the present method the magnesium chlorid in solution saturates the same so that the calcium hydrate is also wholly insoluble and therefore is wholly precipitated with the carbonate.

The method described is very simple and can be carried out with considerable profit, particularly in connection with the caustic soda and ammonia soda processes. It is of particular value at the present time, due to the high cost of magnesium salts and the relatively small supply produced in the United States. In fact, magnesium salts in the past have been almost wholly imported from abroad, due to the high cost of converting the magnesium into available form from native magnesium bearing rock such as is found in this country.

What I claim is:—

1. A process of producing magnesium chlorid, which consists in heating under pressure a solution of a chlorid of an alkaline earth and the sludge resulting from causticizing sodium carbonate with a material containing magnesium hydroxid.

2. A process of producing magnesium chlorid, which consisting in digesting a mixture of calcium chlorid, water and the sludge resulting from causticizing sodium carbonate with a material containing magnesium hydroxid.

3. A process of producing magnesium chlorid, which consists in heating under pressure a mixture of calcium chlorid, water and the sludge resulting from causticizing sodium carbonate with a material containing magnesium hydroxid.

4. A combined process for producing caustic soda and magnesium chlorid, which comprises causticizing sodium carbonate with a compound containing magnesium hydroxid to produce caustic soda, and digesting the resulting sludge with a calcium chlorid solution under heat and pressure to produce magnesium chlorid.

5. A process of producing magnesium chlorid, which consists in heating under pressure the calcium chlorid liquor resulting from the manufacture of an alkali by the ammonia soda process and the sludge resulting from causticizing sodium carbonate with a material containing magnesium hydroxid.

6. A process of producing magnesium chlorid, which consists in heating under pressure the calcium chlorid liquor resulting from the manufacture of an alkali by the ammonia soda process and the sludge resulting from causticizing sodium carbonate with hydrated calcined magnesite.

In testimony whereof I have hereunto set my hand.

HUGH A. GALT.

Witnesses:
R. H. COPELAND,
D. N. CLAUSE.